C. L. GORDON.
DRAFT EQUALIZER.
APPLICATION FILED SEPT. 22, 1921.

1,429,868.

Patented Sept. 19, 1922.

Inventor
Clarke L. Gordon,
By Richard B. Owens
Attorney

Witness:
Louis W. Helmuth

Patented Sept. 19, 1922.

1,429,868

UNITED STATES PATENT OFFICE.

CLARKE L. GORDON, OF STAVELY, ALBERTA, CANADA.

DRAFT EQUALIZER.

Application filed September 22, 1921. Serial No. 502,424.

*To all whom it may concern:*

Be it known that I, CLARKE L. GORDON, a subject of the King of Great Britain, residing at Stavely, in the Province of Alberta, Canada, have invented certain new and useful Improvements in Draft Equalizers, of which the following is a specification.

This invention relates to new and useful improvements in harness and more particularly to that type designed to equally distribute the load to animals hitched in tandem.

An object of the invention is to provide a device which can be attached to the ordinary harness of draft animals and which will cause an equal distribution of the load to the various draft animals forming the team.

Another object of the invention is to embody adjustable features in the device whereby the load may be evenly distributed throughout a team of two or more animals.

A further object of the invention is to provide a device of the above named character including a draft bar or tug having its end which is connected to the hame curved to extend laterally of the body portion of the draft bar so that the latter will be spaced from the body of the animal to which it is applied to prevent the bar from rubbing or chafing the animal.

Another object of the invention is to provide a device which will direct the greater part of the pull to the hames.

A still further object of the invention aims to provide a simple and durable equalizer which is efficient in practice.

Other objects and advantages of the invention will become apparent during the course of the following description.

Figure 1:
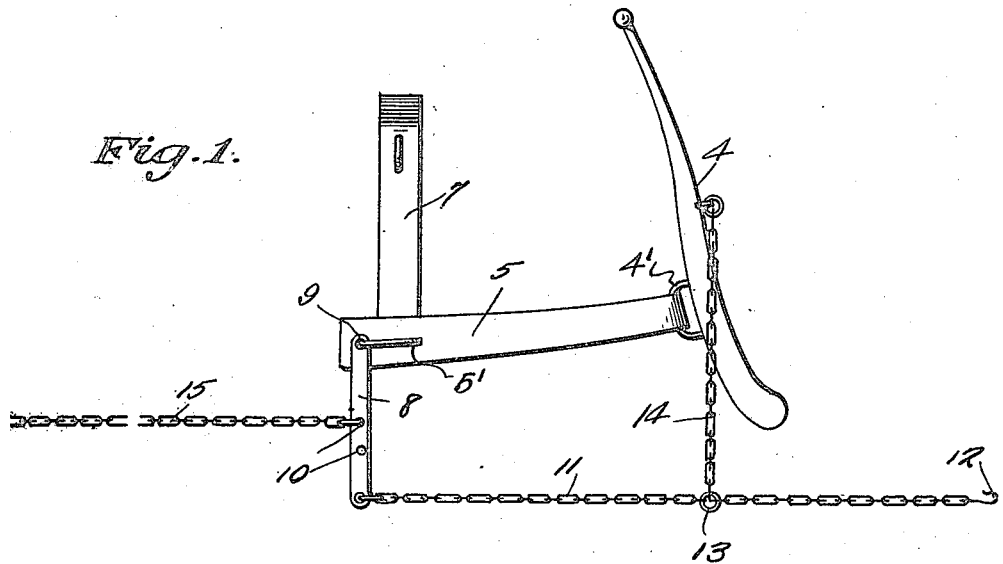
Figure 2:
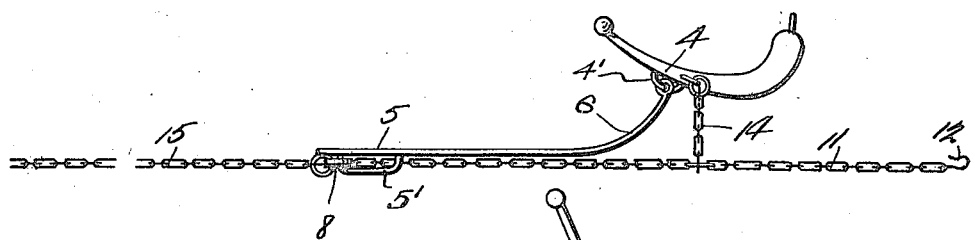
Figure 3:
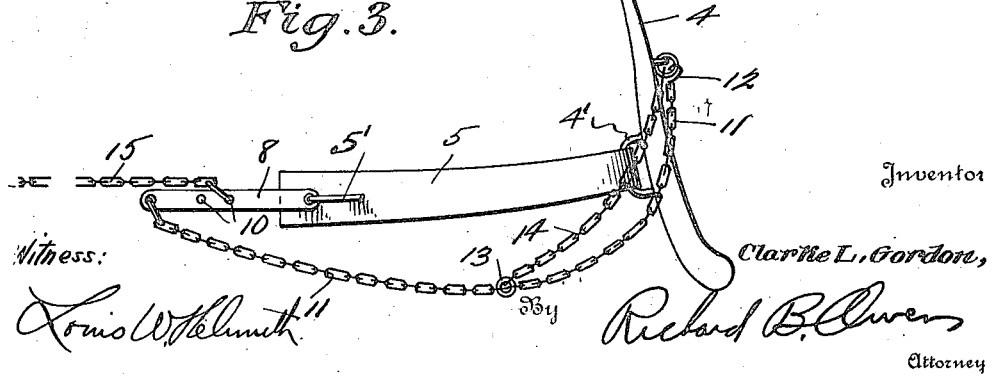

In the accompanying drawings wherein like numerals are employed to designate like parts throughout the several views, Figure 1 is a side elevation of the invention, Figure 2 is a top plan of the same, and Figure 3 is a side elevation of the invention illustrating the position of its component parts when the device is used as an ordinary harness.

In the drawings wherein for the purpose of illustration is shown the preferred embodiment of my invention, the numeral 4 designates an ordinary hame to which is connected between its ends the forward end of a metallic strip 5 and which I will term a draft bar. This bar at its forward end is bent laterally as at 6 as clearly shown in Figure 2, and the bar which elongated, is covered with leather or any other suitable material so as to prevent the same from rubbing and chafing the draft animals. The terminal of the forward end of the bar 5 is bent around a loop 4' for connecting the draft bar 5 with the hame. The rear end of the draft bar is attached to an ordinary back band 7 in any desired manner so that a suitable support for the rear end of the draft bar is provided for.

The upper end of the equalizer link or member 8 is equipped with an aperture 9 for pivotal connection with a horizontally arranged loop 5' carried by the rear end of the draft bar, while the lower end of the equalizer member is provided with a plurality of spaced apertures 10, one of which is arranged approximately midway between the ends of the equalizer member. To the lower end of the equalizer member 8 is connected a tug 11 which assumes the form of an elongated chain terminating in a hook 12 which is adapted for connection to the harness of the animal arranged in advance of the animal carrying the device just described. The tug chain 11 embodies the loop 13 to which a supporting chain 14 is connected, this last chain also being connected to the hame slightly above the connection therewith of the draft bar 5. Obviously, this chain 14 supports the tug chain 11 when the latter is used.

A second tug or trace 15 has its rear end connected to the load which the forward end of this chain is connected to the equalizer member 8 between its ends.

When the device is used on harness of animals which are hitched in tandem, the traces 15 are connected to the load or wagon, it being appreciated that there is a similar device arranged upon each side of the draft animal. The hooks of the tugs are then connected to the harness of the front draft animal with the element 14 serving to support the tug in horizontal position. When the forward animal relaxes, it will be seen that the pull of the rear horse will swing the lower end of the equalizer bar 8 rearwardly thereby permitting the rear animal to catch up on the front animal and urge it along. As soon as the front animal equally shares the load, the equalizer bar 8 will be disposed vertically but as soon as the rear horse relaxes, the upper end of the equalizer bar will be swung rearwardly thereby causing the rear horse to be nudged along by the wagon.

When it is desired to use the device in connection with the tandem of three draft animals traces 15 are lowered to the next opening in the equalizer bar so that the load will be evenly distributed between the three horses. Of course, other openings 10 than are illustrated may be provided in the equalizer bar to meet varying conditions.

When it is desired to use the device in connection with the ordinary harness for two horses without the tandem arrangement, the hooks, 12 of the tugs are engaged with the fasteners which connect with the upper ends of the supporting chains 14 of the hames. This will give the equalizer an opportunity to swing rearwardly as shown in Figure 3 and be disposed horizontally so that all of the load is directed to the hames.

The foregoing description and accompanying drawings have reference to what might be considered to be the approved or preferred form of my invention. I desire it to be understood that I may make such changes in the construction, combination and arrangement of parts, material, dimensions, etc. as may prove expedient and fall within the scope of the appended claims.

Having thus fully described my invention what I claim as new and desire to secure by Letters Patent is:

1. In combination with a hame; of a draft bar adapted to be arranged at the side of the draft animal, said bar having its forward end arcuated inwardly toward the hame for connection therewith whereby the body portion of the bar will be arranged in spaced relation to the animal, an equalizer link pivotally connected to the rear end of said bar, a trace having connection with the link between its ends, and a second trace having connection with the lower end of said link.

2. The combination with a hame having a loop extending rearwardly therefrom; of a draft bar having its forward end curved laterally and inwardly of the hame to be connected with said loop, the rear end of the draft bar being provided with a horizontally arranged loop, an equalizer link pivotally connected to the draft bar loop, a trace having connection with the link between its ends, and a second trace having connection with the lower end of said link.

In testimony whereof he affixes his signature in presence of two witnesses.

CLARKE L. GORDON.

Witnesses:
  COLIN HELETUNE,
  FRANCIS L. BURNET.